US009590848B2

United States Patent
Prakash et al.

(10) Patent No.: US 9,590,848 B2
(45) Date of Patent: Mar. 7, 2017

(54) CLOUD BASED VIRTUAL MOBILE DEVICE

(71) Applicant: Intel Corporation, Santa Clara, CA (US)

(72) Inventors: Gyan Prakash, Beaverton, OR (US); Mojtaba Mojy Mirashrafi, Portland, OR (US); Jiphun Satapathy, Portland, OR (US); Mousumi Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,303

(22) PCT Filed: Mar. 14, 2013

(86) PCT No.: PCT/US2013/031472
§ 371 (c)(1),
(2) Date: Jun. 3, 2013

(87) PCT Pub. No.: WO2014/142894
PCT Pub. Date: Sep. 18, 2014

(65) Prior Publication Data
US 2014/0297823 A1    Oct. 2, 2014

(51) Int. Cl.
*G06F 15/173*    (2006.01)
*H04L 12/24*    (2006.01)
*H04W 4/00*    (2009.01)

(52) U.S. Cl.
CPC ...... *H04L 41/0806* (2013.01); *H04L 41/0816* (2013.01); *H04W 4/003* (2013.01)

(58) Field of Classification Search
CPC ............... H04L 63/0272; H04L 67/125; H04L 67/1095; H04L 41/0806
See application file for complete search history.

(56) References Cited

U.S. PATENT DOCUMENTS 8,060,074 B2 * 11/2011 Danford .............. H04L 41/0893
455/419
2010/0248698 A1    9/2010 In et al.
2011/0252071 A1    10/2011 Cidon
2012/0096271 A1    4/2012 Ramarathinam et al.
(Continued)

FOREIGN PATENT DOCUMENTS

CN    104995616 A    10/2015
WO    WO-2014142894 A1    9/2014

OTHER PUBLICATIONS

"International Application Serial No. PCT/US2013/031472, International Search Report mailed Dec. 2, 2013", 3 pgs.
(Continued)

*Primary Examiner* — Yves Dalencourt
(74) *Attorney, Agent, or Firm* — Schwegman Lundberg & Woessner, P.A.

(57) ABSTRACT

Systems and techniques for a cloud based virtual mobile device are described herein. A virtual mobile device may be initialized to correspond to a physical mobile device. The virtual mobile device may include a representation of a physical mobile device operating environment. A service request for the physical mobile device operating environment may be received. The service request may be fulfilled using the representation of the physical mobile device operating environment.

24 Claims, 4 Drawing Sheets

(56) References Cited

U.S. PATENT DOCUMENTS

2012/0233663 A1* 9/2012 Ortiz .................. H04L 63/0272
726/4
2012/0311564 A1   12/2012 Khalid
2012/0311659 A1   12/2012 Narain et al.
2013/0113993 A1*  5/2013 Dagit, III ................ G06F 3/017
348/552

OTHER PUBLICATIONS

"International Application Serial No. PCT/US2013/031472, Written Opinion mailed Dec. 2, 2013", 4 pgs.
"International Application Serial No. PCT/US2013/031472, International Preliminary Report on Patentability mailed Sep. 24, 2015", 6 pgs.
"European Application Serial No. 13877461.7, Extended European Search Report mailed Jul. 15, 2016", 6 pgs.

* cited by examiner

CLOUD BASED VIRTUAL MOBILE DEVICE

PRIORITY APPLICATIONS

This application is a U.S. National Stage Application under 35 U.S.C. 371 from International Application No. PCT/US2013/031472, filed Mar. 14, 2013, which is hereby incorporated by reference in its entirety.

TECHNICAL FIELD

Embodiments described herein generally relate to a cloud based virtual mobile device.

BACKGROUND

Cloud computing and mobile devices have come together to form a powerful tool for users. Cloud computing may provide anywhere access to significant processing power and storage resources. Mobile devices may provide the ability to access and interact with cloud computing resources from nearly anywhere at nearly anytime.

Cloud computing services are often associated with a provider who also produces a mobile device application to access the particular service. Thus, for example, a user who employs an email service and a file service will often have a mobile device application for each service that respectively has access to each provider's cloud, which may provide separate cloud interfaces for a user to access each service.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Having separate clouds and mobile applications for a variety of services may increase the complexity of a user's mobile experience. This complexity may arise from having to use multiple applications on the mobile device, having to create and track several user accounts and corresponding authentication credentials, ensuring that those multiple applications are properly updated (e.g., maintained), or having to access individual cloud interfaces for each service in order to use the service outside of the mobile device. Further, because individual service providers produce the mobile applications, the mobile device vendor or operator (e.g., telecommunications provider) may restrict access to the operating environment of the mobile device for security or stability purposes. Thus, the user experience may be both complex to manage and limited in functionality.

A virtual mobile device (VMD) that corresponds to a physical mobile device may provide a solution to the aforementioned problems of complexity and functionality in user mobile device-cloud service interactions. A VMD may be a cloud resident simulation of part or all of the physical mobile device that is accessible from the cloud. The VMD may be initialized with a representation of the physical mobile device operating environment. The VMD may be arranged to accept a service request for the physical mobile device and fulfill the service request using the representation of the physical mobile device. Thus, the VMD may stand in for the physical mobile device in a variety of circumstances.

The VMD may be initialized with a copy of some or all of the operating environment of the physical mobile device. In an example, the VMD may include a hardware simulation of some or all of the physical mobile device. In an example, the VMD may be continually modified to reflect changes in the physical mobile device, such as hardware or software changes to the physical mobile device.

Because the VMD simulates the physical mobile device, the user may interact with it in much the same way that the user would interact with the physical mobile device, except via a cloud interface. Thus, for example, making calls, or running applications, may be accomplished without the multitude of service specific cloud interfaces previously mentioned. Further, the VMD may be used to replicate protected hardware or software settings from the physical mobile device to another physical mobile device. Accordingly, using the VMD, user satisfaction may be increased by maintaining the familiarity and functionality of the physical mobile device while increasing access via a cloud interface.

Figure 1:
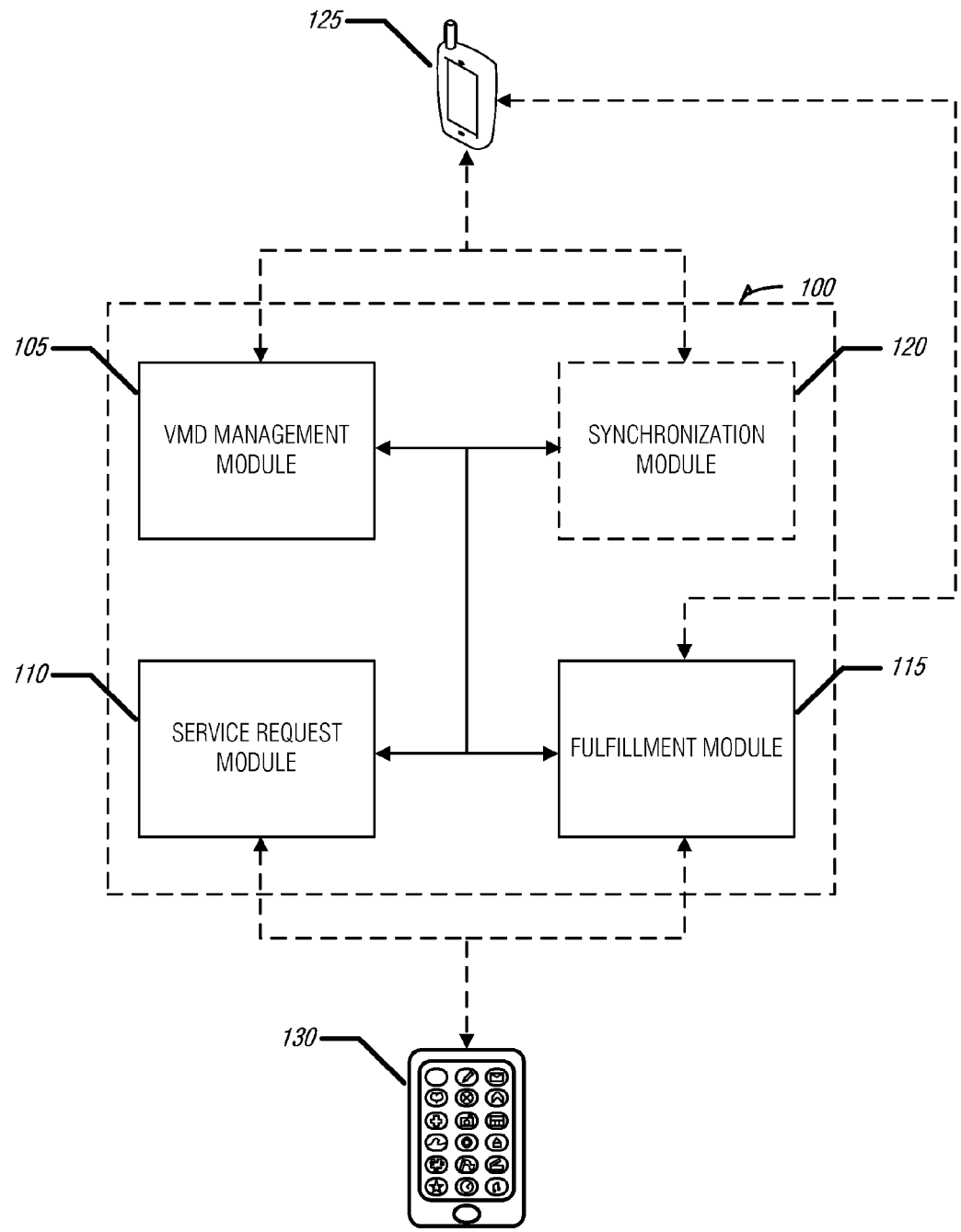
FIG. 1 illustrates an example of a cloud based virtual mobile device, according to an embodiment.

FIG. 1 illustrates an example of a cloud based VMD 100. The VMD 100 may include a VMD management module 105, a service request module 110, and a fulfillment module 115. In an example, the VMD 100 may include a synchronization module 120. In an example, the VMD 100 may reside in a cloud. In an example, the VMD 100 may reside on a client device 130, such as a desktop computer, a laptop computer, a tablet, or another physical mobile device.

The VMD management module 105 may be arranged to initialize the VMD 100 to correspond to a physical mobile device 125. For example, the management module 105 may be a default component for a VMD 100 prior to initialization. In an example, the VMD management module 105 may not be in the VMD 100, as illustrated in FIG. 1, but rather an auxiliary cloud component. In an example, the VMD management module 105 may provide a management interface. In an example, the management interface may be a web-based application accessible from a web browser. In an example, the management interface may be a compact fat-client application arranged to run on a client device 130. In an example, the management interface is arranged to present and receive user selections to produce the VIVID 100. In an example, the management interface is arranged to present and receive user selections to modify an existing VMD 100. In an example, the VMD management module 105 is arranged to initialize an instance of a predefined VMD 100.

The VMD 100 may include a representation of a physical mobile device operating environment once initialized. The physical mobile device operating environment includes one or more hardware or software components comprising the physical mobile device 125. Thus, the initialized VMD 100 may include a representation of these one or more hardware or software components. In an example, the physical mobile device operating environment may include a hardware element of the physical mobile device 125, and the representation of the physical mobile device operating environment may include a virtual hardware element corresponding to the hardware element. A virtual hardware element is an interface that simulates the interface of the hardware element such that applications or other hardware elements may make use of the virtual hardware element without modification. In an example, the physical mobile device operating environment may include the hardware (e.g., all of the hardware) of the physical mobile device 125, and the representation of the physical mobile device operating environment may include a virtual representation of the hardware of the physical mobile device. In this example, the virtual representation of the hardware is arranged to simulate (e.g., emulate) the hardware interfaces of the hardware of the physical mobile device 125.

In an example, the physical mobile device operating environment may include an operating system element, and the representation of the physical mobile device may include a representation of the operating system element. In this example, the representation of the operating system element may include a service interface of the operating system element. In an example, the representation of the operating system element is a copy of the operating system element. In an example, the operating system element is at least one of a password, a physical mobile device policy, an application profile, a device content security setting, or a device management policy.

In an example, the physical mobile device operating environment may include a protected system element. A protected system element is controlled (e.g., managed) by a manufacturer of the physical mobile device 125 or by a provider of the physical mobile device 125. The protected system component is not the operating system of the physical mobile device 125 but is also not under the control of third parties (e.g., individual service providers). In an example, the representation of the physical mobile device 125 may include a representation of the protected system element. In an example, the protected system element may be at least one of a phone application (e.g., an address book, call log, etc.), a camera application, a data area, etc.

In an example, the physical mobile device operating environment may include an application element. An application element is controlled by a third party provider and not by a manufacturer of the physical mobile device 125 or by a provider of the physical mobile device 125. In an example, the representation of the physical mobile device may include a representation of the application element. In an example, the representation of the physical mobile device 125 may include a copy of the application element. In this way, the complete repertoire of functionality on the physical mobile device 125 may be available to a user of the VMD 100.

The service request module 110 may be arranged to receive a service request for the physical mobile device operating environment. A service request is any request that may be made of the hardware or software of the physical mobile device 125. For example, a service request may include an incoming text message or an operating system request from an application designed to run on the physical mobile device 125. In an example, the service request module 110 may be arranged to receive the service request.

In an example, the service request may include a replication request. A replication request may include identification of one or more pieces of data (e.g., personalization information, application policies, applications, etc.).

In an example, the service request module 110 may be arranged to receive the service request via a client input-output interface. In an example, The client input-output interface may be remote (e.g., one of the client device 130) from the physical mobile device 125. In an example, the client input-output interface may be a cloud interface. In an example, the cloud interface may be arranged as a thin client (e.g., web based application) rendered on a client device 130. In an example, the cloud interface may be arranged as a services interface (e.g., web services) such that a fat client on the client device 130 makes calls to the cloud interface to provide a service request. In an example, the client input-output interface may be arranged to translate an input from a first type to a second type based on the capabilities of the client device 130 and the physical mobile device 125. In an example, the first type may be a mouse gesture and the second type may be a motion of the physical mobile device 125.

In an example, the service request may include a request to use a local device-dependent element. Examples of such elements may include local sensors (e.g., ambient light, orientation, compass, etc.), devices (e.g., GPS, camera, transceivers), among other elements. In an example, the local device-dependent element may be at least one of a global positioning system (GPS) sensor, a non-GPS positioning system, or a camera.

In an example, the service request module 110 may be arranged to receive a telecommunications request from a provider of the physical mobile device 125. In an example, the telecommunications request may be an incoming call. In an example, the telecommunications request may be incoming data. In an example, the telecommunications request may be a text message.

The fulfillment module 115 may be arranged to fulfill the service request using the representation of the physical mobile device operating environment. In an example, the fulfillment module 115 may be arranged to authenticate the service request. In an example, the authentication may include a username-password verification. In an example, the authentication may include a device-based authentication mechanism. In an example, the fulfillment module 115 may be arranged to verify that the service request originates from a trusted execution environment. In an example, the trusted execution environment resides on the physical mobile device 125.

In an example, the fulfillment module 115 may be arranged to provide the representation of the physical mobile device operating environment in response to a replication service request. This pairing of replication service request and fulfillment, without other services, may be considered a passive form of the VMD 100 because the VMD 100 generally need not be active (e.g., running or operating) as is the case for the VMD 100 providing other services.

In an example, the fulfillment module 115 may be arranged to remotely connect to the physical mobile device 125 to fulfill the service request and return the results to the VMD 100. For example, if the service request is to use the camera on the physical mobile device 125 to capture an image, the fulfillment module 115 may command the camera to capture the image and then retrieve the image to the VMD 100.

The synchronization module 120 may be arranged to receive a notification of a change in the physical mobile device operating environment. In an example, the synchronization module 120 may be arranged to provide a control message interface and to receive a control message from the physical mobile device 125 via the control message interface. In an example, the control message originates from a trusted execution environment on the physical mobile device 125. In an example, the trusted execution environment controls the synchronization of data between the physical mobile device 125 and the VMD 100. In an example, the synchronization module 120 is arranged to retrieve data specified by the control message. In an example, the synchronization module 120 is arranged to retrieve the specified data from a cloud service (e.g., as opposed to the physical mobile device 125).

The synchronization module 120 may be arranged to update the representation of the physical mobile device operating environment with the change indicated in the notification. Thus, the VMD 100 may remain in synch with the physical mobile device 125.

Figure 2:
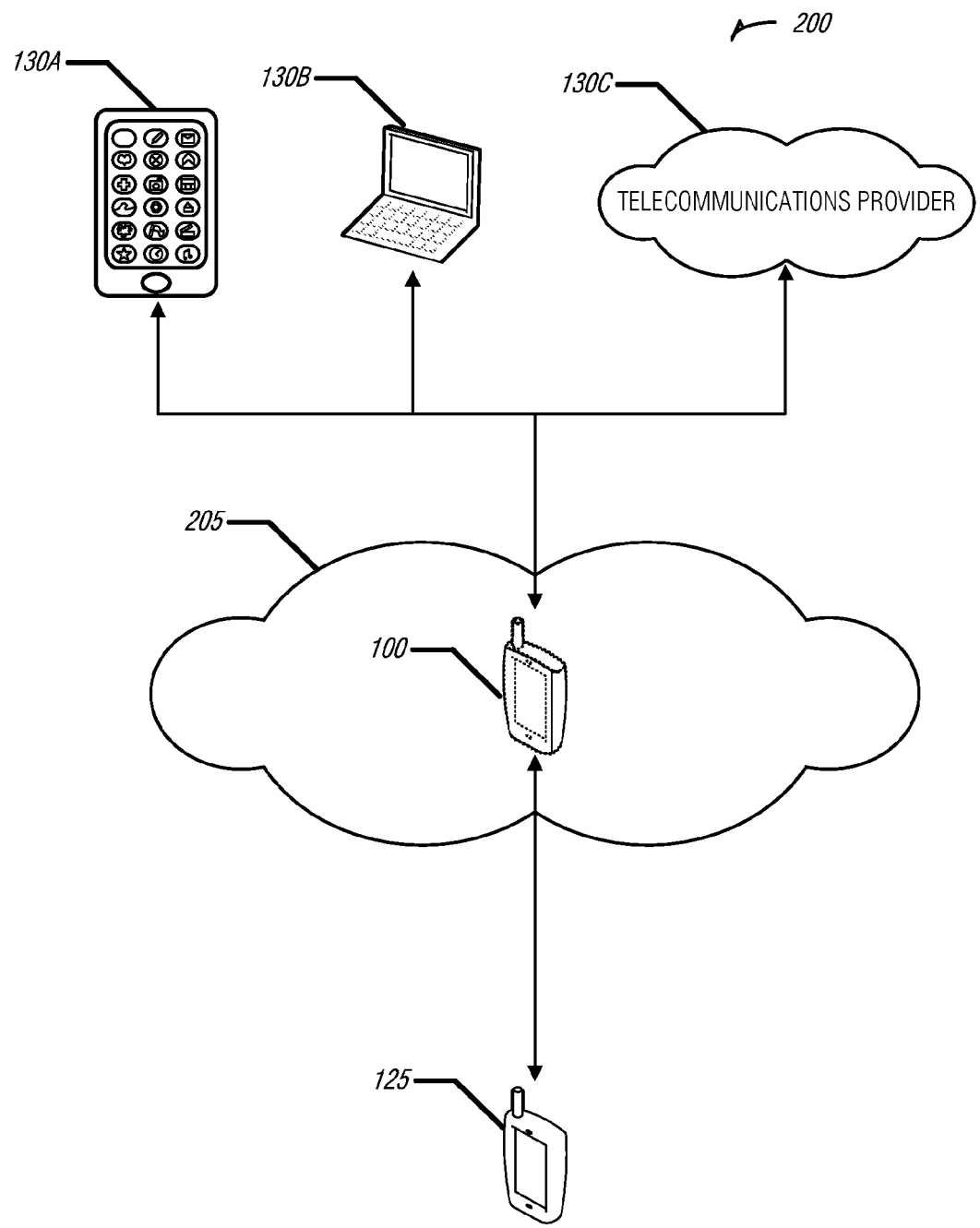
FIG. 2 illustrates an example of a system with a cloud based virtual mobile device, according to an embodiment.

FIG. 2 illustrates an example of a system 200 with a cloud based VMD 100. The system 200 includes typical components, such as client devices 130A-C and a physical mobile device 125 arranged to communicate with the VMD 100 via a cloud 205. As illustrated in FIG. 2, the VMD 100 may provide flexible access to the operating environment of the physical mobile device 125 without having access to the physical mobile device 125. For example, a user may use a tablet 130A to run a game, resident on the physical mobile device 125, from the comfort of his home even if the physical mobile device 125 was left at the office. In another example, the user may use the laptop 130B to retrieve a call log of the physical mobile device 125 which is inoperable because its battery is dead. In a further example, the user may receive calls via the telecommunications provider 130C even after the physical mobile device 125 is destroyed, for example, in a fire. These various examples illustrate the flexibility without a loss of functionality that the described VMD 100 may provide.

Figure 3:
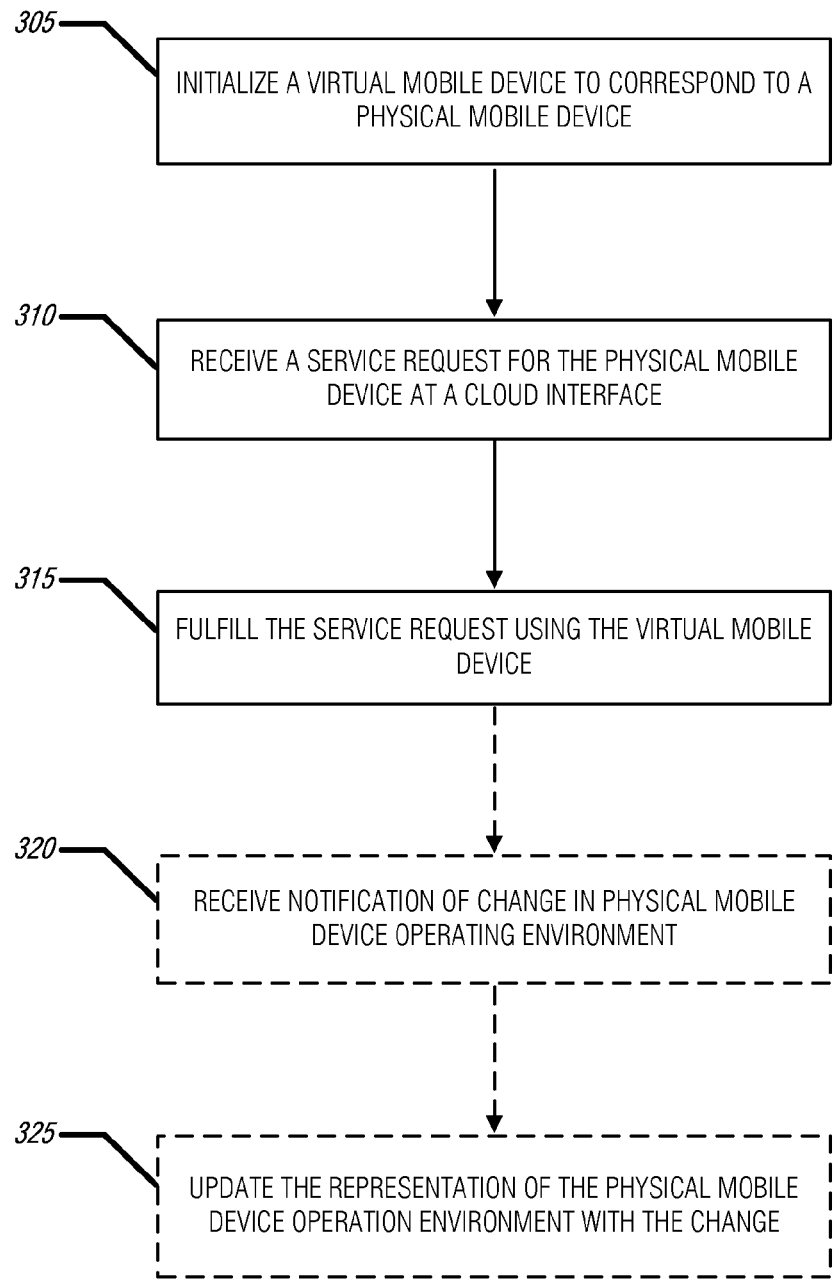
FIG. 3 illustrates an example of a method for implementing a cloud based virtual mobile device, according to an embodiment.

FIG. 3 illustrates an example of a method 300 for implementing a cloud based virtual mobile device. One or more operations of the method 300 may be performed by one or more elements described above with respect to FIGS. 1 and 2. However, other appropriately configured computing hardware may be used to implement any of the operations described below.

At operation 305, a VMD may be initialized to correspond to a physical mobile device. In this example, the VMD may include a representation of the physical mobile device operating environment, for example, after initialization. In an example, the physical mobile device operating environment may include a hardware element of the physical mobile device. Examples may include user input devices (e.g., touch screen, buttons, etc.), communications devices (e.g., a local network transceiver and a cellular network transceiver), processors, memory, etc. In an example, the representation of the physical mobile device operating environment may include a virtual hardware element corresponding to the hardware element in the physical mobile device. For example, if the physical mobile device includes a cellular transceiver, the representation of the physical mobile device operating environment may include a virtual cellular transceiver. The virtual hardware element may be arranged to provide a hardware interface to other elements operating on the VMD such that those other elements may interact with the virtual hardware element without themselves being modified. In an example, the physical mobile device operating environment may include the hardware of the physical mobile device, and the representation of the physical mobile device operating environment includes a virtual representation of the hardware of the physical mobile device, the virtual representation of the hardware arranged to simulate hardware interfaces of the hardware of the physical mobile device. In this example, the entirety of the physical mobile device is simulated by one or more components of the VMD.

In an example, the physical mobile device operating environment may include an operating system element. In an example, the representation of the operating system element may include a service interface of the operating system element. In an example, the representation of the physical mobile device may include a representation of the operating system element. In an example, the operating system element may be at least one of a password, a physical mobile device policy, an application profile, a device content security setting, or a device management policy. In an example, the VMD may include a representation of all operating system elements in the physical mobile device.

At operation 310, a service request may be received, at a cloud interface, for the physical mobile device operating environment. In an example, the service request includes a replication request. A replication request is a request to replicate the operating environment of the physical mobile device to a second physical mobile device. In this way, for example, a lost physical mobile device may be replaced without the user losing much, if any, data, applications, preferences, or other components that make up the user's experience with the physical mobile device.

In an example, receiving the service request may include receiving the service request via a client input-output interface. In an example, the client input-output interface may be remote from the physical mobile device. For example, a user may use an application on a tablet to initiate the service request. In an example, the client input-output interface may be arranged to translate an input from a first type to a second type based on the capabilities of the client and the physical mobile device. For example, if the client input-output interface includes a mouse rather than a touch screen, but the physical mobile device includes a touchscreen (and no mouse), the client input-output interface may translate the motion of the mouse into touch gestures. In an example, the first type of input may be a mouse-gesture. In an example, the second type of input may be a motion of the physical mobile device (e.g., shaking, turning, etc.).

In an example, the service request may include a request to use a local device dependent element. Examples of such elements may include a camera, a directly attached network transceiver, etc. In an example, the local device dependent element may be at least one of a global positioning system (GPS) sensor, a non-GPS positioning system, or a camera.

In an example, receiving the service request may include receiving a telecommunications request from a provider of the physical mobile device. In this example, the telecommunications provider may connect an incoming call to the VIVID rather than, or in addition to, the physical mobile device.

At operation 315, the service request may be fulfilled using the representation of the physical mobile device operating environment. Thus, the service request may be handled even if the physical mobile device is unavailable (e.g., because it is off, incapacitated, or otherwise unavailable). In an example, fulfilling the service request may include authenticating the service request. For example, a user placing the service request for an outgoing call may sign-in to the cloud interface prior to being allowed to make the service request. In an example, authenticating the service request may include verifying that the service request originates from a trusted execution environment. In this example, service requests originating from a device, such as the physical mobile device itself, may be rejected if they do not originate from a trusted execution environment. An example of such a service request, discussed below, is a synchronization request from the physical mobile device to the VMD.

In an example, fulfilling the service request may include remotely connecting to the physical mobile device to fulfill the request and return the results to the VMD. For example, a positioning request, such as those to a GPS system of the physical mobile device, may be executed on the physical mobile device under the direction of the VMD. This may be useful, for example, to locate a lost or stolen physical mobile device.

In the example of a replication service request, fulfilling the service request may include providing the representation of the physical mobile device operating environment. Thus, because the VMD may be a complete simulation of the configurable components of the physical mobile device, providing the representation of the physical mobile device may be used to clone the physical mobile device to a second physical mobile device.

At operation 320, optionally, a notification of a change in the physical mobile device operating environment may be received. In an example, the notification may be generated by a cloud monitoring component arranged to monitor the state of the physical mobile device. In an example, the notification may include a transmission to the VMD that includes the same content as a transmission to the physical mobile device. For example, an application that is acquired through a provider's application storefront may be sent to both the physical mobile device and the VMD. In an example, the VMD may provide a control message interface. In an example, a control message may be received from the physical mobile device via the control message interface. The control message may include a synchronization command or synchronization data.

At operation 325, optionally, the representation of the physical mobile device operating environment may be updated with the change. Thus, the VMD may be kept in synch with the physical mobile device.

Figure 4:
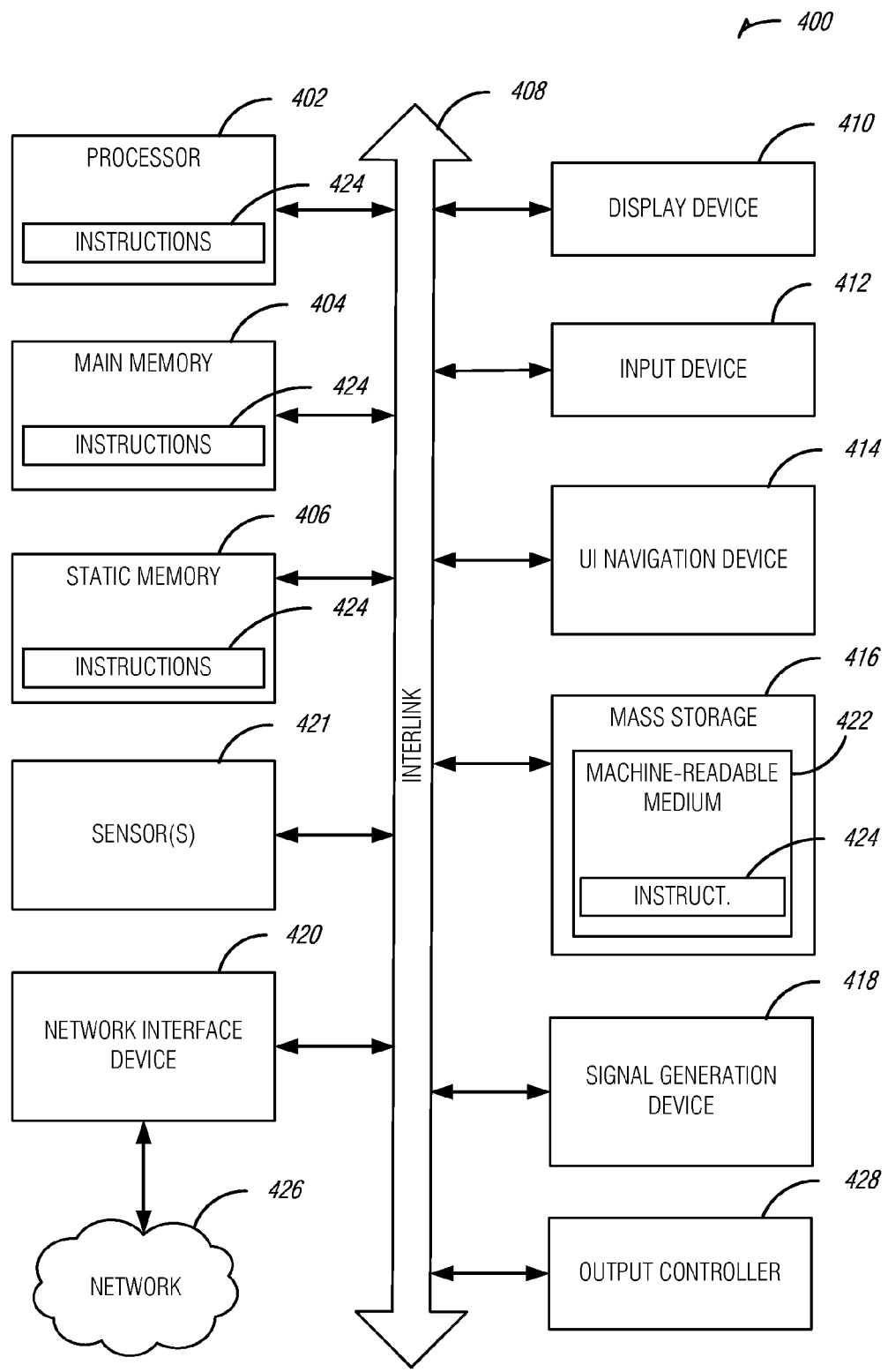
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware and not software) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be initialized at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

Example 1 includes subject matter (such as a device, apparatus, or system for device for a cloud based virtual mobile device) comprising a VMD management module to initialize a virtual mobile device to correspond to a physical mobile device—the virtual mobile device including a representation of the of the physical mobile device operating environment, a service request module to receive a service request—at a cloud interface—for the physical mobile device operating environment, and a fulfillment module to fulfill the service request using the representation of the physical mobile device operating environment.

In Example 2, the subject matter of Example 1 may optionally include, wherein to fulfill the service request includes the fulfillment module to authenticate the service request.

In Example 3, the subject matter of Example 2 may optionally include, wherein to authenticate the service request includes the fulfillment module to verify that the service request originates from a trusted execution environment.

In Example 4, the subject matter of any one of Examples 1-3 may optionally include, wherein the physical mobile device operating environment includes a hardware element of the physical mobile device and the representation of the physical mobile device operating environment includes a virtual hardware element corresponding to the hardware element.

In Example 5, the subject matter of Example 4 may optionally include, wherein the physical mobile device operating environment includes the hardware of the physical mobile device and the representation of the physical mobile device operating environment includes a virtual representation of the hardware of the physical mobile device—the virtual representation of the hardware to simulate hardware interfaces of the hardware of the physical mobile device.

In Example 6, the subject matter of any one of Examples 1-5 may optionally include, wherein the physical mobile device operating environment includes an operating system element and the representation of the physical mobile device includes a representation of the operating system element—the representation of the operating system element including a service interface of the operating system element.

In Example 7, the subject matter of Example 6 may optionally include, wherein the operating system element is at least one of a password—a physical mobile device policy—an application profile—a device content security setting—or a device management policy.

In Example 8, the subject matter of any one of Examples 1-7 may optionally include a synchronization module to receive a notification of a change in the physical mobile device operating environment, and update the representation of the physical mobile device operating environment with the change.

In Example 9, the subject matter of Example 8 may optionally include, wherein to receive the notification includes the synchronization module to provide a control message interface, and receive a control message from the physical mobile device via the control message interface.

In Example 10, the subject matter of any one of Examples 1-9 may optionally include, wherein to receive the service request includes the service request module to receive a replication request—and wherein to fulfill the service request includes the fulfillment module to provide the representation of the physical mobile device operating environment.

In Example 11, the subject matter of any one of Examples 1-10 may optionally include, wherein to receive the service request includes the service request module to receive the service request via a client input-output interface—the client input-output interface being remote from the physical mobile device.

In Example 12, the subject matter of Example 11 may optionally include, wherein the service request includes a request to use a local device dependent element—and wherein to fulfill the service request includes the fulfillment module to remotely connect to the physical mobile device to fulfill the request and return the results to the virtual mobile device.

In Example 13, the subject matter of Example 12 may optionally include, wherein the local device dependent element is at least one of a global positioning system (GPS) sensor—a non-GPS positioning system—or a camera.

In Example 14, the subject matter of any one of Examples 11-13, wherein the client input-output interface is to translate an input from a first type to a second type based on the capabilities of the client and the physical mobile device.

In Example 15, the subject matter of Example 14 may optionally include, wherein the first type is a mouse-gesture and where the second type is a motion of the physical mobile device.

In Example 16, the subject matter of any one of Examples 1-15 may optionally include, wherein to receive the service request includes the service request module to receive a telecommunications request from a provider of the physical mobile device.

Example 17 may include, or may optionally be combined with the subject matter of any one of Examples 1-16 to include, subject matter (such as a method, means for performing acts, or machine readable medium including instructions that, when performed by a machine cause the machine to performs acts) comprising initializing a virtual mobile device to correspond to a physical mobile device—the virtual mobile device including a representation of the physical mobile device operating environment, receiving a service request—at a cloud interface—for the physical mobile device operating environment, and fulfilling the service request using the representation of the physical mobile device operating environment.

In Example 18, the subject matter of Example 17 may optionally include, wherein fulfilling the service request includes authenticating the service request.

In Example 19, the subject matter of Example 18 may optionally include, wherein authenticating the service request includes verifying that the service request originates from a trusted execution environment.

In Example 20, the subject matter of any one of Examples 17-19 may optionally include, wherein the physical mobile device operating environment includes a hardware element of the physical mobile device and the representation of the physical mobile device operating environment includes a virtual hardware element corresponding to the hardware element.

In Example 21, the subject matter of Example 20 may optionally include, wherein the physical mobile device operating environment includes the hardware of the physical mobile device and the representation of the physical mobile device operating environment includes a virtual representation of the hardware of the physical mobile device—the virtual representation of the hardware to simulate hardware interfaces of the hardware of the physical mobile device.

In Example 22, the subject matter of any one of Examples 17-21 may optionally include, wherein the physical mobile device operating environment includes an operating system element and the representation of the physical mobile device includes a representation of the operating system element—the representation of the operating system element including a service interface of the operating system element.

In Example 23, the subject matter of Example 22 may optionally include, wherein the operating system element is at least one of a password—a physical mobile device policy—an application profile—a device content security setting—or a device management policy.

In Example 24, the subject matter of any one of Examples 17-23 may optionally include, wherein the operations comprise receiving a notification of a change in the physical mobile device operating environment, and updating the representation of the physical mobile device operating environment with the change.

In Example 25, the subject matter of Example 24 may optionally include, wherein receiving the notification includes providing a control message interface, and receiving a control message from the physical mobile device via the control message interface.

In Example 26, the subject matter of any one of Examples 17-25 may optionally include, wherein receiving the service request includes a replication request—and wherein fulfilling the service request includes providing the representation of the physical mobile device operating environment.

In Example 27, the subject matter of any one of Examples 17-26 may optionally include, wherein receiving the service request includes receiving the service request via a client input-output interface—the client input-output interface being remote from the physical mobile device.

In Example 28, the subject matter of Example 27 may optionally include, wherein the service request includes a request to use a local device dependent element—and wherein fulfilling the service request includes remotely connecting to the physical mobile device to fulfill the request and return the results to the virtual mobile device.

In Example 29, the subject matter of Example 28 may optionally include, wherein the local device dependent element is at least one of a global positioning system (GPS) sensor—a non-GPS positioning system—or a camera.

In Example 30, the subject matter of any one of Examples 27-29 may optionally include, wherein the client input-output interface is to translate an input from a first type to a second type based on the capabilities of the client and the physical mobile device.

In Example 31, the subject matter of Example 30 may optionally include, wherein the first type is a mouse-gesture and where the second type is a motion of the physical mobile device.

In Example 32, the subject matter of any one of Examples 17-31 may optionally include, wherein receiving the service request includes receiving a telecommunications request from a provider of the physical mobile device.

The above detailed description includes references to the accompanying drawings, which form a part of the detailed description. The drawings show, by way of illustration, specific embodiments in that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for a cloud based virtual mobile device, the system comprising:
   a virtual mobile device (VMD) management module to initialize a virtual mobile device to correspond to a physical mobile device, the virtual mobile device including a representation of the physical mobile device operating environment, wherein the physical mobile device operating environment includes a hardware element of the physical mobile device and the representation of the physical mobile device operating environment includes a virtual hardware element corresponding to the hardware element, the hardware element being a local device-dependent element and the virtual hardware element including a hardware emulator for the local device-dependent element of the physical mobile device;
   a service request module to receive a service request for the physical mobile device operating environment, the service request including a request to use the local device-dependent element; and
   a fulfillment module to fulfill the service request using the representation of the physical mobile device operating environment by using the hardware emulator to:
      provide a VMD interface to receive a hardware request;
      communicate, remotely, with the physical mobile device to fulfill the hardware request;
      receive output from the local-device-dependent element; and
      update the virtual mobile device with the output by responding to the hardware request with the output on the VMD interface.

2. The system of claim 1, wherein the physical mobile device operating environment includes an operating system element and the representation of the physical mobile device includes a representation of the operating system element, the representation of the operating system element including a service interface of the operating system element.

3. The system of claim 1 comprising a synchronization module to:
   receive a notification of a change in the physical mobile device operating environment; and
   update the representation of the physical mobile device operating environment with the change.

4. The system of claim 1, wherein to receive the service request includes the service request module to receive a replication request, and wherein to fulfill the service request includes the fulfillment module to provide the representation of the physical mobile device operating environment.

5. The system of claim 1, wherein to receive the service request includes the service request module to receive the service request via a client input-output interface in a first type, the client input-output interface being remote from the physical mobile device, and translate between the first type and a second type when communicating with the physical mobile device.

6. The system of claim 1, wherein to receive the service request includes the service request module to receive a telecommunications request from a provider of the physical mobile device.

7. The system of claim 1, wherein the local device-dependent element is at least one of a global positioning system (GPS) sensor, a non-GPS positioning system, or a camera.

8. The system of claim 1, wherein the local device-dependent element is a sensor that is at least one of an ambient light sensor, an orientation sensor, a compass, or a transceiver.

9. At least one machine-readable medium for a cloud based virtual mobile device, the machine-readable medium including instructions that, when executed by a machine, cause the machine to perform operations comprising:
   initializing a virtual mobile device to correspond to a physical mobile device, the virtual mobile device including a representation of a physical mobile device operating environment, wherein the physical mobile device operating environment includes a hardware element of the physical mobile device and the representation of the physical mobile device operating environment includes a virtual hardware element corresponding to the hardware element, the hardware element being a local device-dependent element and the virtual hardware element including a hardware emulator for the local device-dependent element of the physical mobile device;
   receiving a service request for the physical mobile device operating environment, the service request including a request to use the local device-dependent element; and
   fulfilling the service request using the representation of the physical mobile device operating environment via the hardware emulator including:
      providing a VMD interface to receive a hardware request;
      communicating, remotely, with the physical mobile device to fulfill the hardware request from the local device-dependent element;
      receiving output from the local-device-dependent element; and
      updating the virtual mobile device with the output by responding to the hardware request with the output on the VMD interface.

10. The machine-readable medium of claim 9, wherein the physical mobile device operating environment includes an operating system element and the representation of the physical mobile device includes a representation of the operating system element, the representation of the operating system element including a service interface of the operating system element.

11. The machine-readable medium of claim 9, wherein the operations comprise:
receiving a notification of a change in the physical mobile device operating environment; and
updating the representation of the physical mobile device operating environment with the change.

12. The machine-readable medium of claim 9, wherein receiving the service request includes a replication request, and wherein fulfilling the service request includes providing the representation of the physical mobile device operating environment.

13. The machine-readable medium of claim 9, wherein receiving the service request includes receiving the service request via a client input-output interface in a first type, the client input-output interface being remote from the physical mobile device and translating between the first type and a second type when communicating with the physical mobile device.

14. The machine-readable medium of claim 9, wherein receiving the service request includes receiving a telecommunications request from a provider of the physical mobile device.

15. The machine readable medium of claim 9, wherein the local device-dependent element is at least one of a global positioning system (GPS) sensor, a non-GPS positioning system, or a camera.

16. The machine readable medium of claim 9, wherein the local device-dependent element is a sensor that is at least one of an ambient light sensor, an orientation sensor, a compass, or a transceiver.

17. A method for a cloud based virtual mobile device, the method comprising:
initializing a virtual mobile device to correspond to a physical mobile device, the virtual mobile device including a representation of a physical mobile device operating environment, wherein the physical mobile device operating environment includes a hardware element of the physical mobile device and the representation of the physical mobile device operating environment includes a virtual hardware element corresponding to the hardware element, the hardware element being a local device-dependent element and the virtual hardware element including a hardware emulator for the local device-dependent element of the physical mobile device;
receiving a service request for the physical mobile device operating environment, the service request including a request to use the local device-dependent element; and
fulfilling the service request using the representation of the physical mobile device operating environment via the hardware emulator including:
providing a VMD interface to receive a hardware request;
communicating, remotely, with the physical mobile device to fulfill the hardware request from the local device-dependent element;
receiving output from the local-device-dependent element; and
updating the virtual mobile device with the output by responding to the hardware request with the output on the VMD interface.

18. The method of claim 17, wherein the physical mobile device operating environment includes an operating system element and the representation of the physical mobile device includes a representation of the operating system element, the representation of the operating system element including a service interface of the operating system element.

19. The method of claim 17, wherein the operations comprise:
receiving a notification of a change in the physical mobile device operating environment; and
updating the representation of the physical mobile device operating environment with the change.

20. The method of claim 17, wherein receiving the service request includes a replication request, and wherein fulfilling the service request includes providing the representation of the physical mobile device operating environment.

21. The method of claim 17, wherein receiving the service request includes receiving the service request via a client input-output interface in a first type, the client input-output interface being remote from the physical mobile device, and translating between the first type and a second type when communicating with the physical mobile device.

22. The method of claim 17, wherein the local device-dependent element is at least one of a global positioning system (GPS) sensor, a non-GPS positioning system, or a camera.

23. The method of claim 17, wherein receiving the service request includes receiving a telecommunications request from a provider of the physical mobile device.

24. The method of claim 17, wherein the local device-dependent element is a sensor that is at least one of an ambient light sensor, an orientation sensor, a compass, or a transceiver.

* * * * *